ം

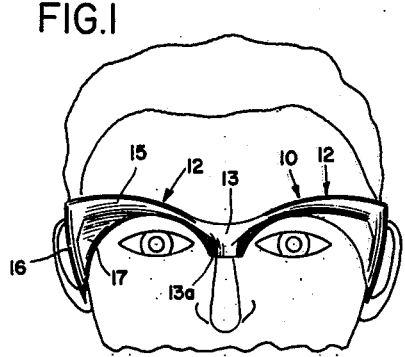
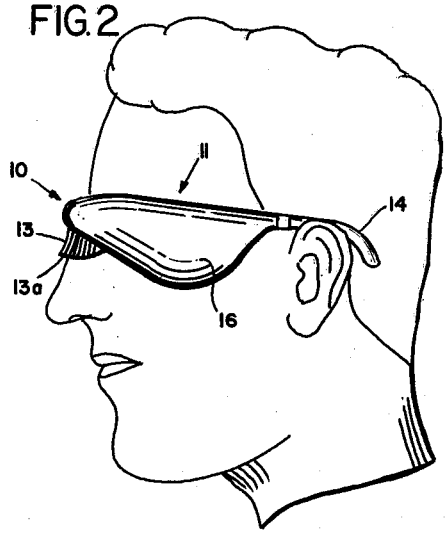
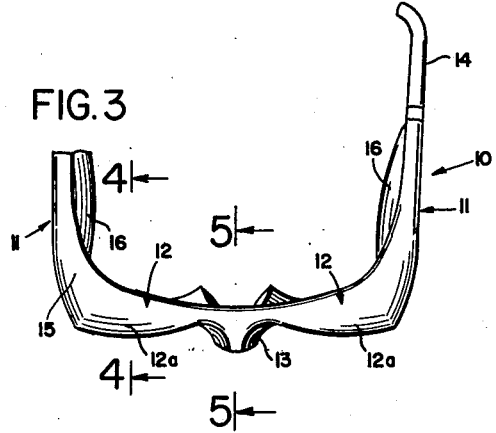
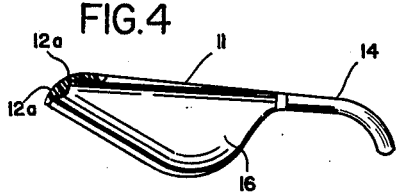
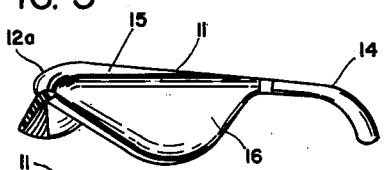
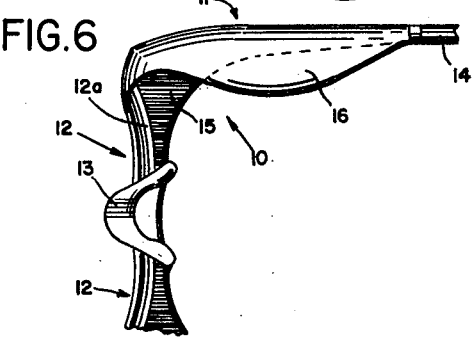
INVENTOR.
ELLIOT A. BYRON

United States Patent Office 3,144,658
Patented Aug. 18, 1964

1

3,144,658
EYE SHIELDS
Elliot A. Byron, 4403 Sexton Lane, Dallas 29, Tex.
Filed June 20, 1962, Ser. No. 203,911
1 Claim. (Cl. 2—12)

This invention relates to eye shields. Eye shields noted in the prior art present one or more of the following deficiencies: they offer a restricted horizontal and/or a restricted vertical view; they are difficult to apply; they involve a complex structure; they are not adaptable to indoor use; they preclude free circulation of air about the eyes.

Among the objects of the present invention are: to provide an eye shield for improved viewing of, for example, a television screen; to provide an eye shield that is protective against distracting side lights; to provide an eye shield that tends to eliminate offensive glare or distressing light from overhead as well as frontal areas; to provide an eye shield that insures the maximum frontal view in utilizing the benefits of both the horizontal and the vertical wide angle vision. Further objects are the provision of an eye shield which is particularly adaptable and suitable for indoor use for viewing an illuminated or a luminous object such as, for example, a television screen; the provision of an eye shield that is not tight fitting to the contours of the face, the temples, the nose, the eye sockets, etc., and which permits exposure of air to the eyes; and the provision of an eye shield which may be utilized as easily as an ordinary pair of eye glasses in that it may be readily applied or removed at any time, and which is simple in construction and easy to manufacture.

The above as well as additional objects will become apparent in the following description wherein reference numerals refer to like-numbered parts in the accompanying drawing. It is to be noted that the drawing is intended primarily for the purpose of illustration and that it is therefore neither desired nor intended to limit the invention necessarily to any or all of the details shown or described except insofar as they may be deemed essential to the invention.

Referring briefly to the drawing,

FIG. 1 is front elevational view of an eye shield embodying features of the present invention.

FIG. 2 is a side elevational view of the same.

FIG. 3 is a fragmentary top plan view of the eye shield.

FIG. 4 is a sectional view taken on the line 4—4 of FIG. 3.

FIG. 5 is a sectional view taken on the line 5—5 of FIG. 3.

FIG. 6 is a fragmentary bottom plan view of the eye shield.

Referring more in detail to the drawing, the numeral 10 designates the eye shield as a whole. Preferably the entire eye shield is made of unitary structure of a suitable light weight relatively rigid material, which may be wholly plastic, wholly metal, partly plastic and partly metal, or of any material or combination of materials which are apt for the purpose. Further, the material should have the property of minimizing internal light reflections, or the pertinent internal surfaces may be finished or coated, not shown, with non-reflecting means, or in a light-diffusing manner.

2

The eye shield 10 is shown as including the elements 11, 12 and 13. The elements 11 are the temples, the elements 12 are the equivalent of the top arms of eye glasses, and the element 13 constitutes the nose piece. In the embodiment illustrated, these elements are all integral parts of the unitary eye shield. The ear pieces are shown at 14 as extensions of the temples 11; however, an elastic head band or the like, not shown, may be substituted for the ear pieces.

The nosepiece 13, which is shaped to conform to the contours of the upper part of the nose, constitutes a bridge between the top arms 12. These top arms extend forward a distance with respect to the vertical plane through the eyes of the wearer, to provide an overhang 12a, which serves to exclude light from above. The degree of such overhang is, above a certain minimum of, say, about three-fourths of an inch. To exclude light from the sides, a junction or union portion 15 is provided between the top arm 12 and the adjacent temple 11, along the top of the device, which blends with depending side portions or wings 16 from the temples 11, which are rounded somewhat and curve inward in a downward direction, toward the wearer's head substantially as illustrated in FIGS. 1 and 2. The side portions 16 blend, at their forward extremities, with depending curved portions 17 extending from the outer ends of the top arms 12.

It is apparent from the foregoing that when the eye shield is worn interfering light from the top and the sides is excluded so that a clear and unstrained frontal view is had.

Television viewing in the normal household, hospital or place of business does not enjoy the same light protection as is afforded in motion picture theaters, as in the latter there are no windows, no lighted ceiling, and no floor or table lamps, any of which normally interferes with television viewing. Another advantage of the instant eye shield is that it may be used in a prone position, and this is especially advantageous for children watching television.

The instant eye shield is also adaptable for reading next to or under a lamp or other source of illumination. In all situations where it is necessary to direct the eyes toward the object viewed and where interfering illumination is present, the instant eye shield affords protection to the eyes and thus provides eye comfort to the viewer.

While the invention has been described with particular reference to the disclosure in the drawing, such is not to be construed as a limitation upon the invention which is best defined in the accompanying claim.

It is to be noted that the nose piece 13 has a depth such that, when in position for viewing, its lower edge 13a is positioned below the level of the eye pupils. As a consequence, light which might come from a direction to one side but from a slightly frontal position at a small acute angle to the plane of the eyes, and from which the eye on that side is protected by the portion 17, will be blocked from striking the other eye by the obstruction provided by the nose piece.

What is claimed and desired to be secured by Letters Patent is as follows:

A unitary eye shield structure of relatively light weight rigid material consisting of a nose piece of concavo-convex configuration adapted to extend from a position above the eyes of a wearer to a position below the eyes and to conform to the upper part of the nose of the wearer, a pair of upwardly arched concavo-convex top arms extending oppositely from the nose piece and adapted to overlie and closely conform to the eyebrows of the wearer and including depending inwardly concaved lower portions at their outer ends, and integral side pieces extending rearwardly at substantially right angles to said top arm, said side pieces including concavo-convex bulbous intermediate portions having substantially horizontal inwardly convex top edges, said bulbous portions being adapted to overlie and surround the cheek bones of the wearer, and temples extending rearwardly from and aligned with the top edges of the sides pieces and terminating in hooks adapted to engage behind the ears of the wearer.

References Cited in the file of this patent

UNITED STATES PATENTS

| | | |
|---|---|---|
| 1,911,842 | Naulty | May 30, 1933 |
| 2,211,366 | Cooper | Aug. 13, 1940 |
| 2,276,372 | Courtney | Mar. 17, 1942 |
| 2,530,881 | Houston | Nov. 21, 1950 |
| 2,545,078 | Gardner | Mar. 13, 1951 |

FOREIGN PATENTS

| | | |
|---|---|---|
| 514,272 | Great Britain | Nov. 3, 1939 |